United States Patent [19]

Green

[11] 4,411,048
[45] Oct. 25, 1983

[54] END CLOSURE FOR SAUSAGE CASINGS

[75] Inventor: Edward A. T. Green, Denny, England

[73] Assignee: Devro, Inc., Somerville, N.J.

[21] Appl. No.: 260,506

[22] Filed: May 4, 1981

[51] Int. Cl.³ .................. A22C 13/00; A22C 11/12
[52] U.S. Cl. .................................... 17/49; 17/1 R; 426/140
[58] Field of Search ............... 17/1 R, 1 F, 41, 42, 17/49; 426/140

[56] References Cited

U.S. PATENT DOCUMENTS

| 3,274,005 | 9/1966 | Alsys | 17/49 X |
| 3,383,222 | 5/1968 | Alsys et al. | 17/49 X |
| 3,564,647 | 2/1971 | Matecki | 17/42 |
| 3,892,869 | 7/1975 | Sheridan et al. | 17/49 X |
| 3,942,568 | 3/1976 | Stemmler | 17/49 X |
| 3,942,569 | 3/1976 | Becker et al. | 17/49 X |
| 4,070,729 | 1/1978 | Tums et al. | 17/49 X |

Primary Examiner—Willie G. Abercrombie

[57] ABSTRACT

An end closure for a thin-walled shirred sausage casing strand and a method and apparatus for making it, which comprises of de-shirring an end portion from the strand, twisting this de-shirred portion into an axially cord under controlled tension, inturning and twisting this cord into a forming tube which is supporting the strand and then compressing the inturned twisted cord against a fixed surface to form a free floating end plug.

3 Claims, 10 Drawing Figures

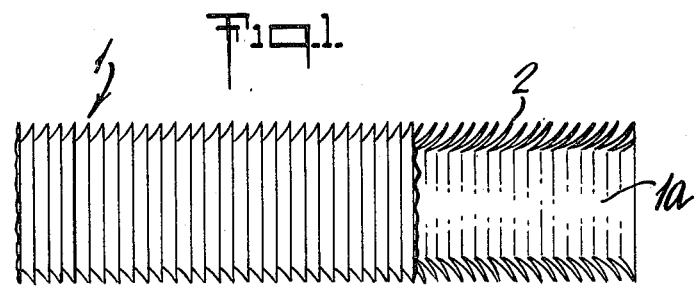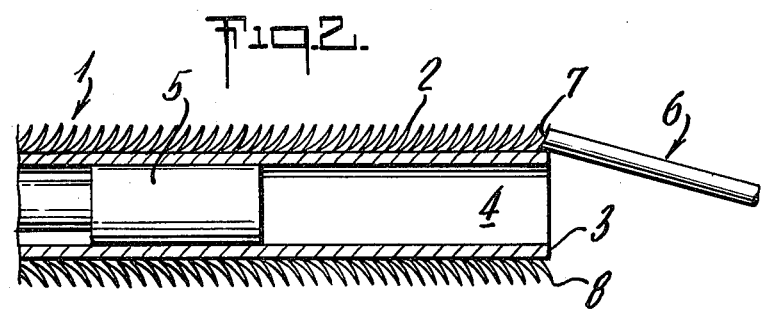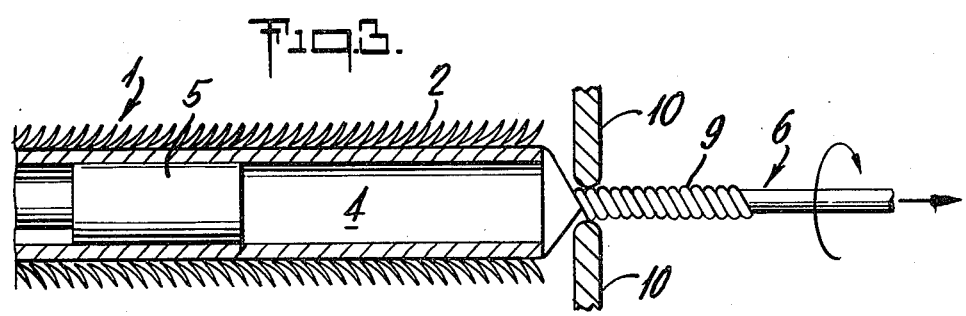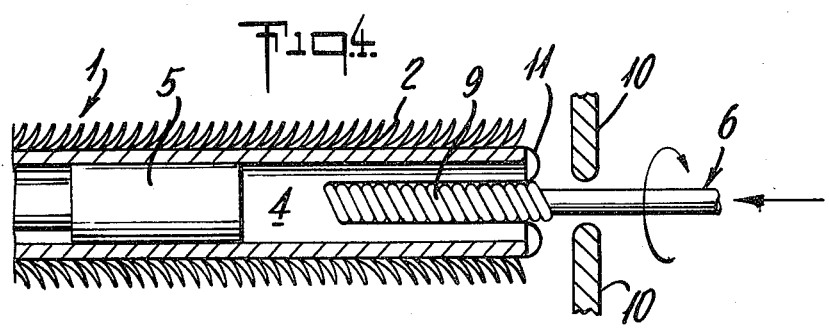

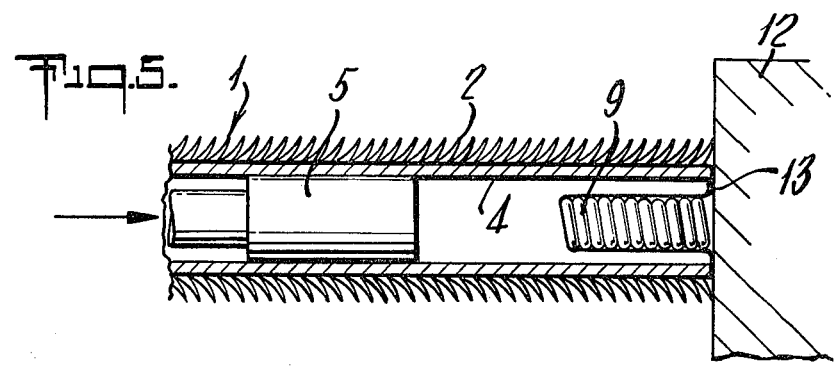
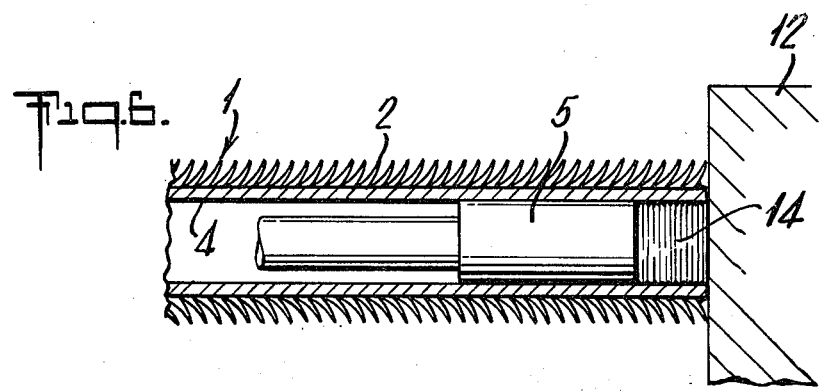
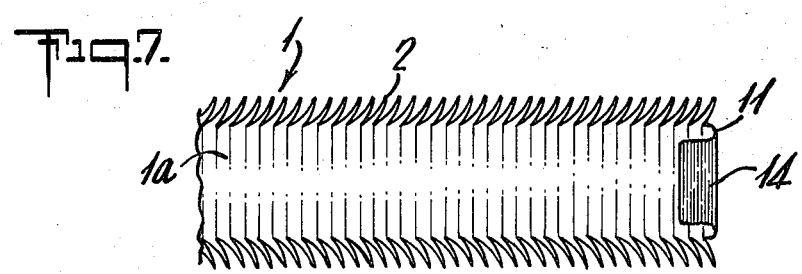
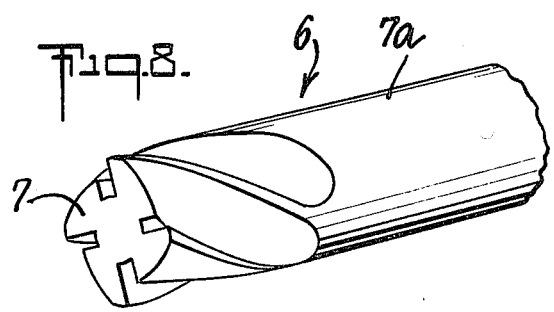

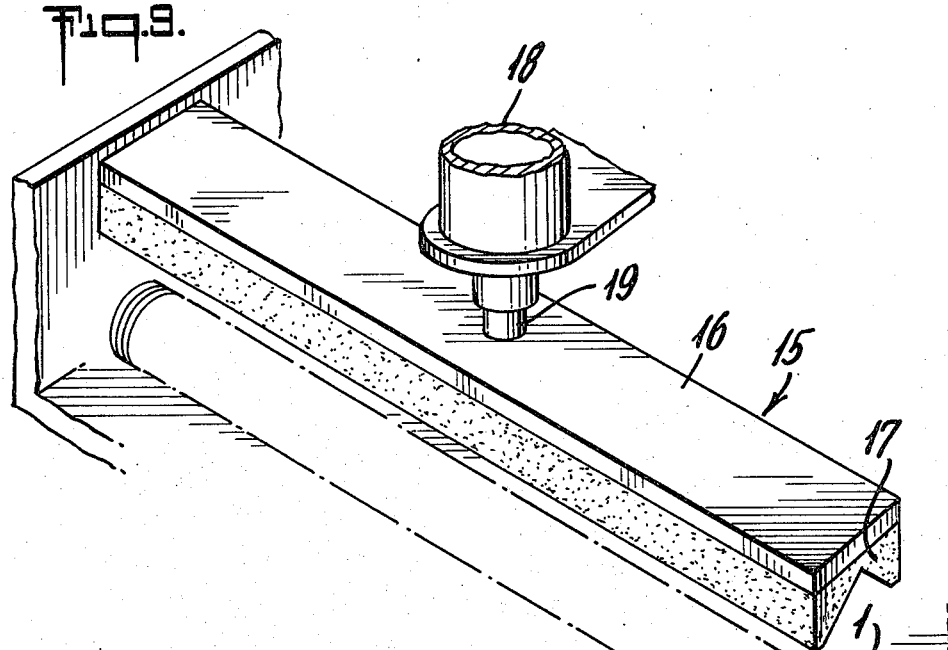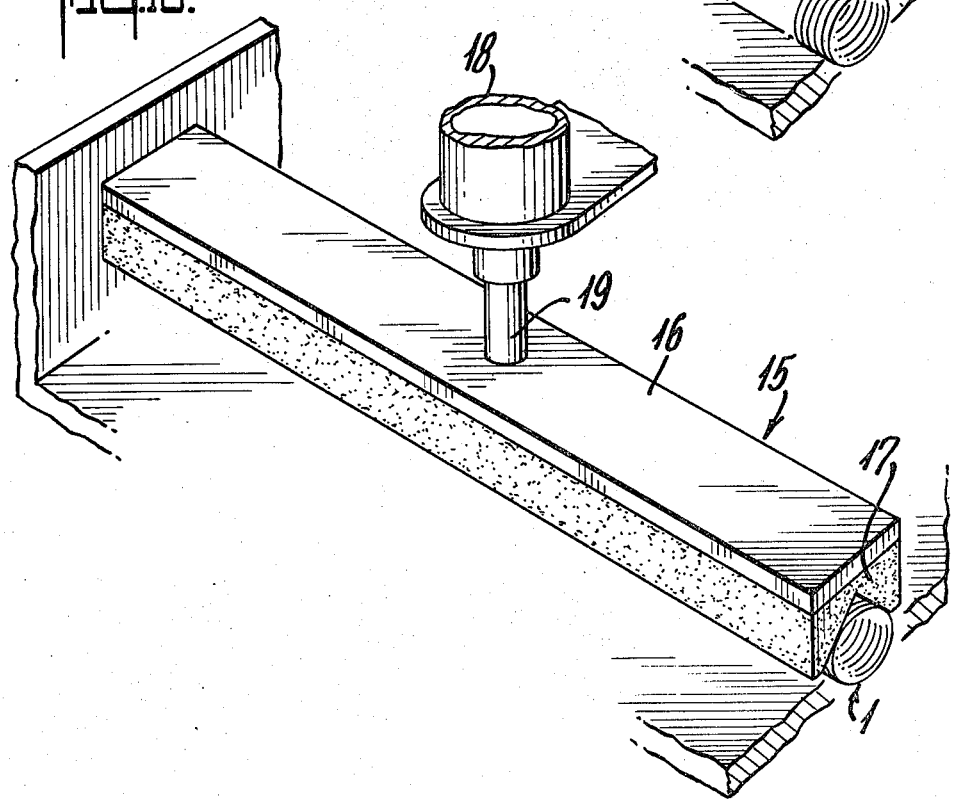

END CLOSURE FOR SAUSAGE CASINGS

This invention relates to end-closed sausage casing, an improved shirred strand of tubular food casing and more particularly to a shirred strand having an end closure, and to a method and apparatus for producing it.

BACKGROUND OF THE INVENTION

Tubular food casings, particularly sausage casings, are supplied to sausage manufacturers in strands, particularly shirred strands, open at both ends. In order to manufacture a sausage product, individual shirred strands of casing are placed on stuffing horns and filled with the sausage emulsion. Prior to commencement of the said filling, it is necessary for an operator to manually de-shirr a short length of casing from the end of the shirred strand to effect a closure, or alternatively to hold it closed until sufficient sausage emulsion has been extruded into the end of the casing so as to prevent the flow of the sausage emulsion out of the casing. This manually performed operation considerably slows the sausage manufacturing procedure.

Automated machines have now been developed for the stuffing and/or stuffing and linking of shirred sausage casings and the use of these machines, as for example that disclosed in the U.K. Pat. No. 1,563,571, can greatly increase the rate of sausage production. With the advent of high speed automatic sausage stuffing machines, there is a need for a shirred casing strand having a closed end so that the shirred casing strand can be placed, manually or automatically, on a stuffing horn and filled with sausage emulsion without further action on the part of the machine operator.

Recent attempts have been made to close the ends of strands of casing by various techniques, twisting as shown in U.K. Pat. No. 1,082,222 and U.S. Pat. Nos. 4,070,729 and 4,075,938, compressed plugs as shown in U.S. Pat. No. 3,892,869 and U.K. Pat. No. 1,080,387, the use of adhesives as shown in U.K. Pat. No. 1,426,355 as well as knotting and heat sealing the casing material.

However, it has been found that when the shirred casing is of thin-wall construction, e.g., edible collagen casing of wall thickness 0.0007" to 0.001", a number of problems occur.

In some cases the closure that is formed has insufficient strength to prevent blowout of the end under pressure of the sausage emulsion. In other cases the closure formed allows a double thickness of casing material to be trapped between the stuffing horn and the control chuck or breaking ring during loading of the shirred strand. This usually results in casing rupture as it is subjected to the pressure of the sausage emulsion. Thirdly, the end seal may be of such integrity that there is no possibility that the pressure of the incoming sausage meat on the entrapped air be dissipated. This equally results in casing rupture.

SUMMARY OF THE INVENTION

The present invention provides a strand of sausage casing, particularly a shirred strand of thin-walled sausage casing, closed at one end by an end-closure constituted by a twisted end portion of said strand invaginated into said strand and axially compressed against the end wall of said strand.

By the use of an end-closed sausage casing in accordance with the present invention the necessity for a manual end-closing operation is avoided, the end closure penetrates 'cleanly' the stuffing horn control chuck during the loading operation, and has sufficient residual strength to withstand the pressure of the sausage emulsion as well as dissipate air pressure build-up.

The present invention further provides a method of end-closing a strand of sausage casing, particularly a shirred strand of thin-walled sausage casing, comprising twisting an end portion of said strand into an axially extending cord, invaginating said cord into said strand to form an end wall, and axially compressing said invaginated cord against said end wall.

The present invention even further provides apparatus for end-closing a strand of sausage casing, particularly a shirred strand of thin-walled sausage casing, comprising a tubular mandrel for supporting said strand of sausage casing, a piston axially slidable within said mandrel, means for twisting an end portion of said strand into an axially extending cord, means for controlling the tension of said cord, and an anvil movable into, and out of, abutment with the end of said mandrel to provide a compression surface for co-action with said piston.

This means for twisting may be a tool adapted to invaginate said cord into said strand.

The means for controlling tension may comprise, for example, a plurality of tensioning fingers arranged radially in a common plane and spaced axially from the end of the mandrel, said fingers each being movable axially thereof into and out of a tension-controlling position.

The present invention also provides a method of making sausages using a strand of sausage casing made in accordance with the present invention.

DETAILED DESCRIPTION

A preferred embodiment in accordance with the present invention will now be described, by way of example, with reference to the accompanying diagrammatic Drawings in which:

FIG. 1 is a side elevation, partly in section, of an open-ended shirred strand of sausage casing;

FIG. 2 is a side elevation, partly in section, of the strand of sausage casing of FIG. 1 supported on a mandrel at the commencement of the end-closing method of the present invention;

FIGS. 3 to 6 illustrate further steps in the end-closing method;

FIG. 7 is a sectional side elevation of an end-closed shirred strand of sausage casing in accordance with the present invention; and FIG. 8 is a perspective view of a multipoint twisting tool which may be used in the method of the present invention.

FIG. 9 is a perspective view of a clamping device used in the present invention in a raised position.

FIG. 10 is a perspective view of the clamping device in a closed position.

Referring to FIG. 1 of the Drawings, an open-ended tubular strand 1 of sausage casing extruded from collagen has been shirred with a multitude of pleats 2 in a manner well known to those versed in the art. The casing is thin-walled e.g., the thickness of the casing wall is about (0.7" to 1.0")×0.001. Open-ended strands of other thin-walled sausage casings may be end-closed by the method of the present invention.

Referring to FIG. 2, the shirred strand 1 of FIG. 1 is shown supported on a tubular mandrel 3 after insertion of the mandrel 3 into the bore 1a of strand 1. Fitted into the bore 4 of mandrel 3 is an axially slidable compression piston 5.

Also illustrated in FIG. 2 is a multipoint twisting tool 6 having a hollow ground tip 7. This tool is shown in more detail in FIG. 8. The shaft 7a of tool has a diameter of about 0.125". In use, the tip 7 of twisting tool 6 is pressed against the end shirred pleat 8 of the strand 1 and the tool 6 is rotated. As this rotation takes place, the twisting tool 6 is slowly drawn away linearly from the strand 1. With this drawing away of the tool 6, deshirring of the end portion of the strand 1 takes place and this deshirred end portion is twisted. During the twisting step, the supported strand 1 is prevented from turning about its axis by means of a clamp shown in FIGS. 9 and 10.

FIG. 3 illustrates the result of the rotating and withdrawal of the twisting tool 6 and shows that a small number of pleats 2 has been deshirred and twisted into an axially extending cord 9. In order to ensure that the cord 9 is twisted with the correct degree of tension, tensioning fingers 10 arranged radially in a common plane and spaced axially from the end of mandrel 3 are held against the casing material as it is being deshirred and twisted. Once a sufficient number of twists has been obtained, the linear direction of movement of the twisting tool 6 is reversed so that the twisted cord 9 is pushed back through itself (invaginated) into the mandrel bore 4 while the rotation of the twisting tool 6 is maintained in the same direction. During this step the tensioning fingers 10 act as guides for the twisted cord 9 so that it is inserted axially into the mandrel bore 4.

FIG. 4 illustrates the twisted cord 9 invaginated into the bore 4 of the mandrel 3, thus forming an end wall 11 for the strand 1. The twisting tool's rotational direction is reversed and is withdrawn linearly away from the twisted and invaginated casing material. This reverse twisting of the tool 6 is sufficient to disengage the tool 6 from the twisted cord 9, and the tensioning fingers 10 will ensure that no invaginated cord 9 is withdrawn from the mandrel bore 4 as the twisting tool 6 is disengaged and withdrawn.

FIG. 5 illustrates the shirred strand 1 with the twisted cord 9 of casing material invaginated into the mandrel bore 4. The tensioning fingers 10 have been withdrawn from the tension controlling position, and an anvil 12 has been moved into a position so that its compression surface 13 abuts the end of the shirred strand and mandrel 3. It is against this compression surface 13 that the compression piston 5 compresses the twisted cord 9.

FIG. 6 illustrates the shirred strand 1 with the twisted cord 9 invaginated in the mandrel bore 4 and compressed between the piston 5 and the anvil 12, so that the twisted cord 9 is compressed against the end wall 11 into a hard compacted knot 14 contained within the mandrel bore 4. The mandrel 3 is then removed from the shirred strand, but to avoid withdrawal of the knot 14 with the mandrel 3, it is necessary to maintain the pressure on the piston 5 while the mandrel 3 is partially withdrawn and this will cause the complete knot 14 to be ejected from the mandrel 3. Once the knot 14 has been ejected, the mandrel 3 and compression piston 5 can readily be removed from the bore 1a of strand 1.

FIG. 7 illustrates the result of the end closing procedure. The hard compressed knot 14 can be seen positioned centrally within the bore 1a of the shirred strand 1.

It will be seen that the present invention provides a strand of sausage casing closed at one end by an end-closure constituted by a twisted end portion of said strand invaginated into said strand and axially compressed against the end wall of said strand.

The basic advantage of this type of end closure is that during the loading on a stuffing machine horn the hard knot 14 will be pushed through the stuffing horn chuck cleanly, avoiding the likelihood of a double thickness of casing material being trapped between the horn and check.

Further, during the initial pressure surge of the sausage emulsion, the knot 14 can partially untwist to withstand any sudden shock load which could cause casing rupture.

By varying the twisting tension of the end closure, for example by changing the position or applied force of the tensioning fingers 10, and the force applied on the compression piston 5, the degree of untwisting during the initial surge of sausage emulsion can be controlled. This results in an end enclosure for thin-walled sausage casing being able to withstand a variety of shock load conditions.

This demonstrates the versatility of an end closure produced in accordance with the present invention, as compared with known end closures, in that it can be adjusted to suit the requirements of particular sausage stuffing machines.

FIGS. 9 and 10 show one suitable clamp 15 for preventing the supported strand 1 from turning about its longitudinal axis during the twisting step in the formation of the end closure. The clamp 15 comprises a rectangular backing plate 16 mounting on its lower face a co-terminous inverted V-section strip 17 of polyurethane foam. The clamp 15 may be lowered from the raised position shown in FIG. 9 onto the supported strand 1 as shown in FIG. 10 by means of an operating cylinder 18 and piston 19, so that in the lowered, operative position of clamp 15, the strand 1 is gripped by strip 17 and prevented from rotating.

I claim:

1. Apparatus for end-closing a strand of sausage casing comprising a tubular mandrel for supporting said strand of sausage casing; a piston axially slidable within said mandrel, means for twisting an end portion of said strand into an axially extending cord, a plurality of tensioning fingers arranged radially in a common plane and spaced axially from the end of said mandrel, said fingers each being movable axially hereof into and out of a tension controlling position, and axially compressing said cord to form an end closure.

2. Apparatus according to claim 1 further including a clamp capable of moving into contact with said strand to prevent said strand from turning as the end portion of the strand is twisted.

3. A method of end-closing a strand of sausage casing comprising clamping the strand to prevent the strand from rotating about its longitudinal axis, twisting an end portion of said strand into a cord axially extending beyond the end of the strand, moving tensioning fingers into contact with the axially extending portion of said strand to maintain tension in said strand as said strand is twisted, removing said tensioning fingers from contact with said strand, invaginating said cord into said strand to form an end wall, and axially compressing said invaginated cord against said end wall to form an end closure.

* * * * *